UNITED STATES PATENT OFFICE.

JOHN L. HOPPER, OF SHELBINA, MISSOURI.

PROCESS OF DISINTEGRATING REFRACTORY ORES.

SPECIFICATION forming part of Letters Patent No. 437,990, dated October 7, 1890.

Application filed December 21, 1889. Serial No. 334,883. (No specimens.)

*To all whom it may concern:*

Be it known that I, JOHN L. HOPPER, a citizen of the United States, residing at Shelbina, in the county of Shelby and State of Missouri, have invented certain new and useful Improvements in Compositions for Subduing Refractory Ores; and I do declare the following to be a full, clear, and exact description of the invention, such as will enable others skilled in the art to which it appertains to make and use the same.

My composition consists of the following ingredients, combined in the proportions stated, viz., pure water, ten gallons; common salt, five pounds; saltpeter, one pound. These ingredients are to be thoroughly mingled by agitation, and it is obvious that their proportions may be varied without departing from the spirit of my invention.

In using the said composition I bring the ore to be subdued or disintegrated to a red heat, which desulphurizes and leaves it in an open or relaxed condition. While the ore is still in the highly heated state it is immersed in the bath of my composition, where it is allowed to remain until cool. The salt and saltpeter acting upon the ore in its relaxed condition effect a slacking or disintegration thereof and render the separation materially easier. After cooling and being treated in the bath, the ore is run through common steel crushing-rolls, whereby it is readily reduced to a powder, when it may in this condition without further treatment be carried to the smelter or settling tubs.

By the employment of saltpeter in my composition I have a much more powerful bath than otherwise, as the strong acid effect produced by the saltpeter enables me to readily disintegrate the most refractory ores with but one heating, which, if but salt and water were used, would necessitate several heatings and baths to properly subdue them.

I am aware of the patent granted to J. C. Ayer, March 7, 1865, in which a saline solution is described for the disintegration of the less refractory ores—such as gold, silver, and copper—but I am not aware that saltpeter and salt have been used together in the treatment of such metals.

Having described my invention, what I claim, and desire to secure by Letters Patent, is—

1. The herein-described composition of matter to be used for disintegrating or subduing refractory ore, consisting of water, salt, and saltpeter in the proportions specified.

2. The process of softening and subduing refractory ores, consisting in fusing or bringing said ore to a red heat and then subjecting it to a bath composed of a solution of salt, saltpeter, and water, substantially as specified.

JOHN L. HOPPER.

Witnesses:
JOHN R. LYELL,
WILLIAM H. KING.